(12) United States Patent
Boger

(10) Patent No.: US 6,790,417 B2
(45) Date of Patent: Sep. 14, 2004

(54) MONOLITH LOOP REACTORS

(75) Inventor: Thorsten R. Boger, Idstein-Walsdorf (DE)

(73) Assignee: Corning Incorporated, Corning, NY (US)

( * ) Notice: Subject to any disclaimer, the term of this patent is extended or adjusted under 35 U.S.C. 154(b) by 292 days.

(21) Appl. No.: 09/746,209

(22) Filed: Dec. 21, 2000

(65) Prior Publication Data

US 2002/0081254 A1 Jun. 27, 2002

(51) Int. Cl.[7] .............................. B01J 8/02; B01J 35/04
(52) U.S. Cl. ...................... 422/222; 422/211; 422/218; 422/224; 422/225; 422/231
(58) Field of Search ................... 422/211, 215, 422/218, 220, 222, 224, 225, 229, 231, 190, 198, 200, 202

(56) References Cited

U.S. PATENT DOCUMENTS

| | | | |
|---|---|---|---|
| 3,948,810 A | 4/1976 | Hervert | 502/527.22 |
| 3,987,226 A | 10/1976 | Yasar | 95/12 |
| 4,234,560 A | 11/1980 | Kuerten et al. | 422/224 |
| 4,363,787 A | 12/1982 | Yoon | 422/201 |
| 4,378,336 A | 3/1983 | Yoon | 422/201 |
| 4,673,553 A | 6/1987 | Retallick | 422/180 |
| 4,705,621 A | 11/1987 | Penick | 422/220 |
| 4,795,616 A | 1/1989 | Mondt et al. | 422/179 |
| 4,947,803 A | 8/1990 | Zenz | 422/146 |
| 4,985,212 A | 1/1991 | Kawakami et al. | 422/179 |
| 5,294,411 A | 3/1994 | Breuer et al. | 422/174 |
| 5,314,665 A | 5/1994 | Iwasa | 422/180 |
| 5,336,472 A | 8/1994 | Toyoda et al. | 422/177 |
| 5,618,501 A | 4/1997 | Wieres et al. | 422/180 |
| 5,804,147 A | * 9/1998 | Blanchet et al. | 422/171 |
| 5,866,077 A | 2/1999 | Sakurai et al. | 422/174 |
| 6,080,372 A | 6/2000 | Machado | 422/190 |
| 6,086,832 A | 7/2000 | Ohta | 422/211 |
| 6,087,455 A | * 7/2000 | Lange et al. | 525/338 |

OTHER PUBLICATIONS

Chemical Engineering and Processing 38 (1999), "Mass transfer in gas–liquid contractors", E.S. Gaddis, pp. 503–510.

Catalysis Today 49 (1999), "Hydrogenation of p–isobutyl acetophenone using a Ru/Al2O3 catalyst: reaction kinetics and modelling of a semi–batch slurry reactor", Mathew et al., pp. 49–56.

* cited by examiner

Primary Examiner—Hien Tran
(74) Attorney, Agent, or Firm—Kees van der Sterre

(57) ABSTRACT

An improved recirculating tank reactor incorporating the advantages of a fixed catalyst includes a monolithic honeycomb catalyst positioned within the tank in such a manner so as to provide an adjacent bypass passageway. Internal flow activation means are provided for recirculating the reactant liquid within the tank in such a manner that it sequentially flows through channels in the catalyzed honeycomb substrate and around the substrate through the bypass passageway.

9 Claims, 6 Drawing Sheets

— P-IBAP
···· 4-IBCMK
--- p-IBPE
—·— 4-IBCHE
— p-IBEB

MONOLITH LOOP REACTORS

BACKGROUND OF THE INVENTION

This invention relates to design improvements for catalytic reactors and other mass or energy transfer systems used to process liquid solutions or mixtures in the chemical industry, and particularly includes new designs for recirculating or so-called loop reactors incorporating honeycomb monoliths as essential catalyst-supporting or flow-regulating structures.

The chemical industry employs a wide variety of recirculating tank or batch reactors for chemically or physically processing chemical mixtures that include liquid solutions or mixtures, examples of specific reactor types including stirred tank, bubble column, and jet loop reactors. Many reactors of above mentioned type and of the prior art utilize solid catalyst granules or particles which are dispersed within a liquid medium comprising one or more reactants via stirrers or agitators, or via the addition of momentum through gas or liquid streams, to produce a product. When a gas is required to produce the product, it is usually fed into the reactor below the agitator, so that the agitator may also serve in the re-dispersion of large bubbles which may form in the reactor.

Although such stirred tank, bubble column, and jet loop reactors are usable for both continuous as well as for batch production, the catalytic particles experience continual attrition and must be separated from the reactant liquid to obtain the final product liquid. The required separation of the catalyst particles requires additional apparatus and operating procedures that add significant cost. Further, even with agitation, still zones with different hydrodynamic conditions exist and settling of the catalytic particles may occur.

Also, bubble size in a gas/liquid reactor is a strong function of the agitation produced. Often coalescence occurs, which produces larger bubbles, reduces gas/liquid mass transfer effectiveness, and yields unfavorable catalyst residence time distributions for the gas and sometimes the liquid.

One approach toward improving gas-liquid distribution in a tank reactor is shown in U.S. Pat. No. 4,234,650. In that patent, a gas is injected within a liquid jet into a large circulation tube within a reactor enclosure. The resulting gas/liquid mixture is then recirculated through and around the tube.

Structured or monolithic catalysts such as catalyst honeycombs offer the advantage of allowing for thin catalyst layers with high effectiveness factors and excellent mass transfer characteristics. However, as shown in U.S. Pat. No. 4,363,787, monolith use in the prior art typically involves fixed-bed, continuousoperation reactors. One variation on this approach, shown in Baltzer Science Publishers, August 1999, volume 3 (1999), page 35, circulates small moveable monoliths continuously through a reservoir of reactant liquid.

None of the prior art structured catalyst reactor designs have offered sufficient practical or economic advantages to displace any of the stirred tank, bubble column, and jet loop designs used for commercial processes. Thus the disadvantages attending the use of particulate catalysts in such reactors have not yet been overcome.

SUMMARY OF THE INVENTION

In view of the foregoing, the present invention provides an improved method and apparatus for transforming a chemical reactant into a desired product using a fixed catalyst. In particular, the invention provides improved recirculating catalytic tank reactors for processing a liquid medium (a mixture, solution, or suspension comprising at least one liquid phase) utilizing a monolithic honeycomb catalyst bed in combination with internal agitation flow means for circulating and recirculating a liquid comprising reactants and products around and through the channels provided within the honeycombs. The reactants and products may comprise single species or mixtures, and may be present in the liquid medium as dissolved or dispersed gases, liquids, or solids.

These recirculating reactors, hereinafter termed monolith loop reactors and including reactor types such as jet loop, stirred tank and bubble column reactors, produce the improved operational results such as controlled reactor behavior, excellent kinetic properties, and a high effectiveness factor. Moreover, the improved reactors do not have the problems related to catalyst handling associated with typical slurry reactors. Specifically avoided are problems relating to separation of the catalyst particles from the product stream, settling of the catalytic particles within the reactor, and continual attrition of the particles.

The loop reactors of the present invention include at least one honeycomb monolithic catalyst, formed of catalytic material or comprising a substrate with a suitable catalyst provided on surfaces thereof, fixedly positioned within the tank. At least one bypass passageway is provided adjacent the catalytic substrate, and internal agitator means are provided to recirculate liquid medium comprising reactants through the catalyzed flow channels of the monolith and about the monolithic substrate by means of the bypass passageway. Reactor designs for both two-phase (liquid-solid catalyst) and three-phase (gas-liquid-solid catalyst) chemical, biochemical and petrochemical processes are provided. Internal agitators for the liquid medium may comprise mechanical, liquid jet, or gas bubble agitators.

The reactor designs of the invention may also be adapted for use in other fluid processing applications, examples of such applications including adsorption, absorption, or extraction processes for promoting mass or energy transfer among any two or three of a liquid phase, a gas phase, and a solid material disposed on or in the honeycomb monolith. A useful liquid processing apparatus for such applications includes a suitable liquid containment vessel in which the honeycomb monolith is disposed, the honeycomb being positioned between upper and lower collection chambers in the vessel.

For these applications the honeycomb may or may not be provided with a catalyst or adsorbent, but in any case it will incorporate a plurality of parallel open channels connecting the upper and lower chambers. Also included within the containment vessel will be at least one by-pass conduit or passageway connecting the upper and lower chambers, that passageway providing a return path for the recirculation of gases and liquids in the vessel through the honeycomb. Again, energy for driving the recirculation may be supplied by mechanical, liquid or gas bubble agitation means such as a blade stirrer, gas sparger, liquid jet, or liquid jet/gas ejector system of the kind employed with jet loop reactors.

BRIEF DESCRIPTION OF THE DRAWINGS

The invention may be further understood by reference to the drawings, which are not intended to indicate scale or relative proportions of the elements shown, but wherein like reference characters designate like or corresponding parts in the various figures.

DESCRIPTION OF THE PREFERRED EMBODIMENTS

Various specific reactor constructions provided in accordance with the invention are effective to overcome the aforementioned problems relating to conventional stirred tank, bubble column and jet loop reactors. Thus the specific examples of reactor designs hereinafter more particularly described are intended to be merely illustrative of the invention, rather than limiting.

Figure 1:
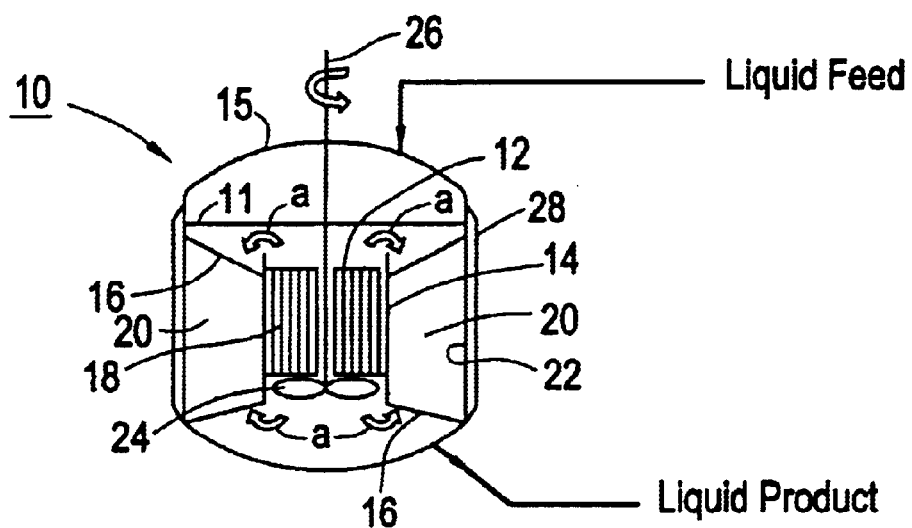
FIG. 1 is a schematic view of a tank reactor of the present invention showing a centrally positioned honeycomb monolithic catalytic substrate and a blade type of agitator flow means.

Referring first to FIG. 1, a monolith loop tank reactor 10 is shown having a reactant liquid feed inlet and a liquid product outlet. The liquid level within the tank 10 is shown at 11. A cylindrical honeycomb monolithic substrate 12, retained in a tube type basket container 14, is fixedly positioned centrally of the tank diameter by suitable support rods or brackets 16. The substrate 12 has a plurality of longitudinal flow channels 18 extending therethrough, and a suitable catalyst is deposited on the surfaces of such channels. A ring-shape or annular bypass passageway 20 extends between the tubular container 14 and inner wall portions 22 of the reactor tank 10. A blade type propeller or agitator 24, mounted on a rotatable rod or shaft 26, functions as an internal flow generator for the transport of liquid through the catalyzed flow channels 18 of monolithic substrate 12 and the re-circulation of reactant liquid within bypass passageway 20, as shown by arrows a.

If desired, the tube container 14 with the substrate 12 and the rod 26 with agitator 24 may be fixed to a removable cover portion 15 of the reactor 10. The blade agitator 24 on shaft 26 is concentrically positioned for functionality within tube container 14, however it may be located above the monolith and thereby closer to the reactor cover to reduce mechanical stresses commonly applied to long stirrer shafts. A heat exchanger 28 may be utilized for heat exchange through the reactor wall. Alternatively, conventional heat exchange structures internal to the reactor or comprising an external circulation loop through a heat exchanger (not shown) may be provided.

Figure 2:
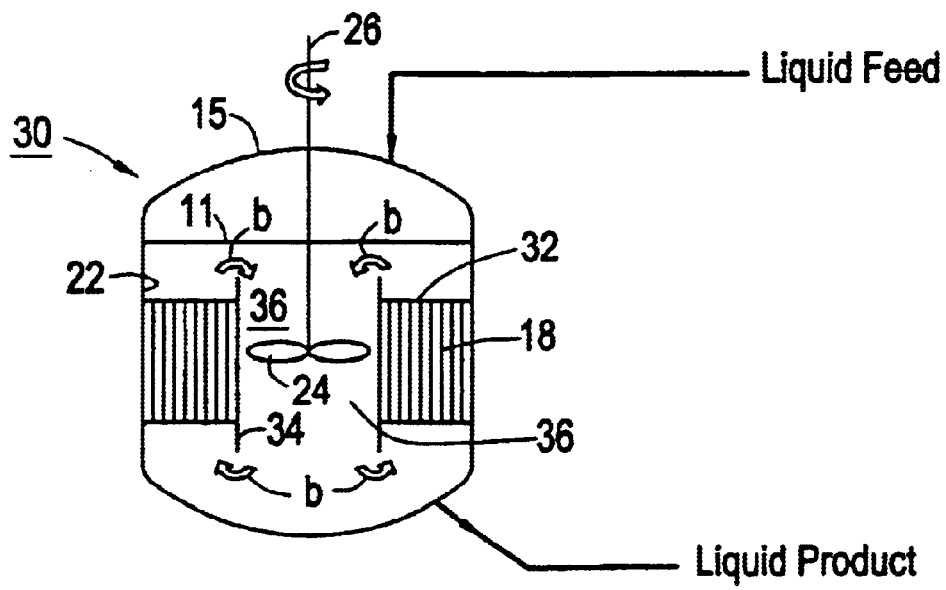
FIG. 2 is a schematic view of a tank reactor of the present invention showing a peripherally positioned honeycomb monolithic catalytic substrate with a blade type of agitator flow means.

The monolith loop reactor 30 of FIG. 2 is similar in many respects to reactor 10 of FIG. 1, except that an annular honeycomb monolithic substrate 32 is retained in a ring or annular shape container 34 fixedly positioned to inner wall portions 22 of reactor 30. A central bypass or flow passageway 36 is formed centrally of the annular substrate. Blade agitator 24 mounted on rotatable rod or shaft 26 is positioned within the passageway 36 and functions as an internal flow generator for the flow of liquid through the catalyzed flow channels 18 of monolithic substrate 32 and the re-circulation of reactant liquid within bypass passageway 36, as shown by arrows b.

The embodiments shown in FIGS. 1 and 2 easily lend themselves to simple and straight forward retrofit to existing stirred reactors. The required catalyst surface areas and hydrodynamic conditions such as velocity in the channels are easily adjusted. The reactors may be designed with any height/diameter ratio, since the liquid mixing and reactor behavior is defined only by the recirculation ratio (velocity/(2 times reactor height)). The higher the recirculation ratio, the closer the behavior is like a conventional stirred tank reactor, and the lower the recirculation ratio, the closer the behavior is like a plug flow reactor. The blade agitator not only provides for the circulating flow of the liquid within the reactor, but also serves to disperse liquid phases when more than one liquid phase is present. Also, the required mechanical energy is comparable, if not better than that required for standard stirred tank reactors, since the pressure drop of the monolith is relatively low and the liquid/catalyst interface is improved due to the defined catalytically charged flow paths for the liquid. Accordingly energy losses due to ineffective dissipation are minimized.

Figure 3:
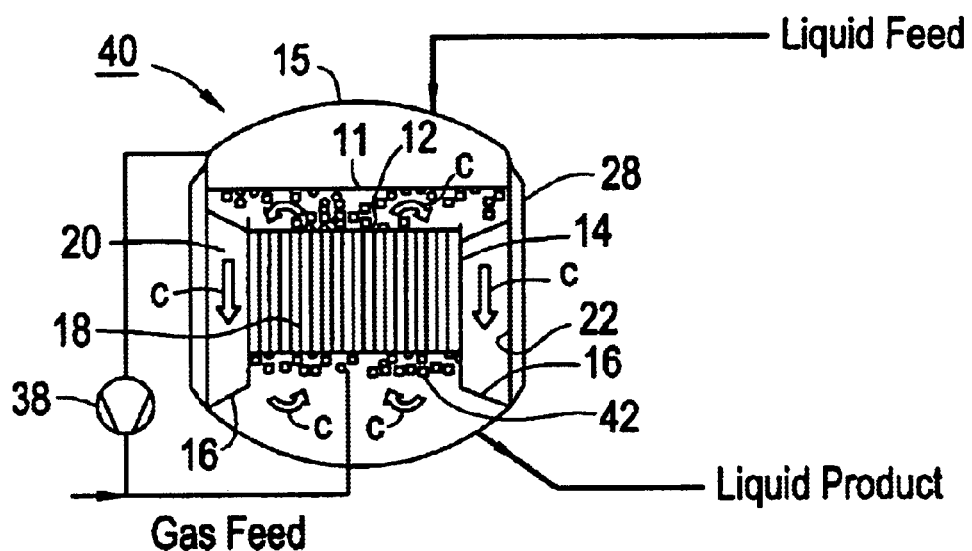
FIG. 3 is a schematic view of a tank reactor of the present invention showing a centrally positioned honeycomb monolithic catalytic substrate and a gas header type of agitator flow means.
Figure 4:
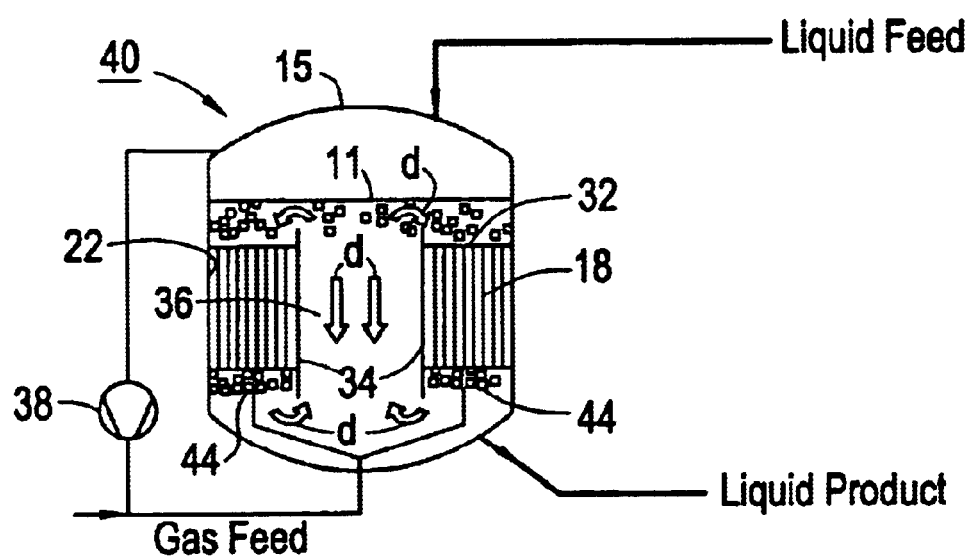
FIG. 4 is a schematic view of a tank reactor of the present invention showing a peripherally positioned honeycomb monolithic catalytic substrate with peripherally positioned gas header type of agitator flow means.
Figure 5:
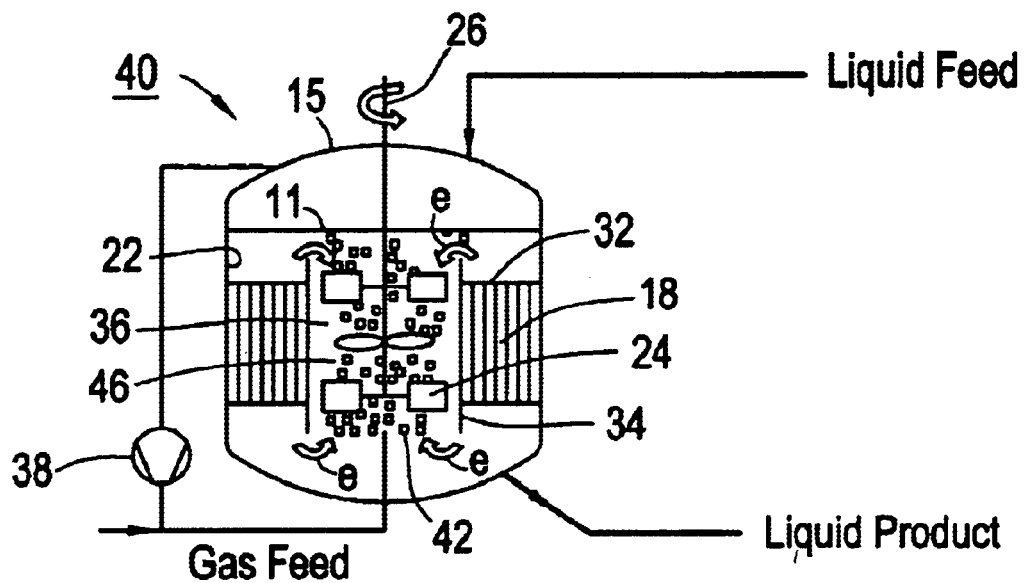
FIG. 5 is a schematic view of a tank reactor of the present invention showing a peripherally positioned honeycomb monolithic catalytic substrate with both blade type and gas header type agitator flow means.
Figure 6:
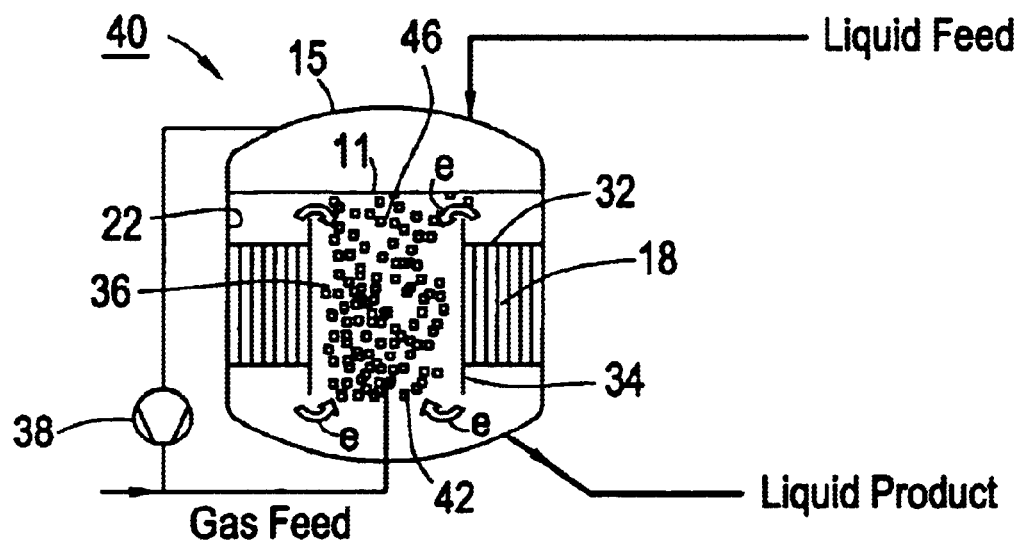
FIG. 6 is a schematic view of a tank reactor of the present invention showing a peripherally positioned honeycomb monolithic catalytic substrate with centrally positioned gas header type of agitator flow means.

The monolithic loop reactor embodiments 40 shown in FIGS. 5 and 6 are adapted for a three-phase or solid catalyzed gas/liquid reaction, and have a recirculating gas feed system with a control valve 38. It will be noted that the position of the honeycomb monolithic substrate 12 of FIG. 3 is similar to that of FIG. 1, whereas the position of the honeycomb monolithic substrate 32 of FIGS. 4, 5 and 6, is similar to that of FIG. 2. However, the internal flow agitator utilized in the embodiments of FIGS. 3 and 4 is in the form of a gas header or sparger. In FIG. 3, the header or sparger 42 is in the form of a disk positioned within container 14 below monolith or monolithic substrate 12, whereas in FIG. 4, the header or sparger 44 is in the form of a ring or annulus and positioned within container 34 below monolith or monolithic substrate 32.

With spargers 42 and 44 being positioned below the monoliths 12 and 32, respectively, the upward flow of gas bubbles 46 from the agitators 42, 44 through the monoliths provide the internal flow means for circulating reactant liquid upwardly through channels 18 within the monoliths and downwardly along the bypass passageways as shown by arrows c and d. The resulting difference in density between the upward-flowing gas/liquid mixture in the monoliths and the pure liquid in down-comer bypass passageways 20 and 36 functions to enhance the driving force of flow. That is, the "lighter" gas/liquid mixture tends to rise, whereas the "heavier" pure liquid tends to flow downwardly in the bypass passageway. The density difference between the gas/liquid mixture and the pure liquid together with the size of channels 18 must be considered so that frictional flow losses through the monolith are minimized.

It will be noted that the separation of the gas bubbles 46 from the liquid occurs in the top cover area or cover portion 15 of the reactors 40. The gas from headers 42,44 may be recycled and forced back, together with fresh gas, into the reactors through the gas supply system. The gas/liquid separation from the product liquid is easily accomplished at the bottom of the reactor, where no gas bubbles are present, and no additional moving parts are required. If more flow is desired through the monoliths, a blade agitator may be added in a manner similar to the embodiments of FIGS. 1 and 2.

The construction of the reactor embodiment of FIG. 5 is similar in many respects to that of FIG. 4, but with a reverse flow pattern. That is, instead of an annular agitator header 44 below the monolith for forcing flow upwardly through the channels of the monolith, a disk agitator header or sparger 42 is positioned within the central bypass passageway 36 for creating a recirculating flow within the reactor 40 as shown by arrows e. The reactant liquid in passageway 36 is saturated with gas bubbles 46 from the gas feeder system before it is fed into the catalyzed channels 18 of the monolith substrate 32. As shown, blade type agitators or stirrers 24 attached to a rotatable rod 26 may be included in passage 36 if desired to minimize bubble size and optimize gas/liquid mass transfer, as well as to support the natural direction of flow within the reactor.

The reactor embodiment shown in FIG. 6 is similar to that of FIG. 5, except that no mechanical flow agitator is utilized with the bubble flow agitator. As shown in FIG. 6, the recirculating flow of the reactant liquid, as shown by arrows e, is the same as that shown in FIG. 5. That is, the flow generated by the gas feed from agitator header 42, producing upwardly moving bubbles 46 in passageway 36, provides sufficient internal flow means for circulating reactant liquid through catalyzed channels 18 of monolith 32 and along bypass passageway 36 adjacent the monolith.

The efficiency with which bubble flow agitation drives the recirculation of reactants through honeycomb catalyst beds depends on a number of factors including the cell density and wall thickness of the honeycombs, the density and viscosity of the gas and liquid phases, and frictional effects governing the impedance to fluid flow within the channels of the monoliths. However, the hydrodynamic operating characteristics of these reactors can be predicted with reasonable accuracy based on existing knowledge concerning frictional effects on fluid flow and the densities and viscosities of candidate liquids and gases.

Figure 7:
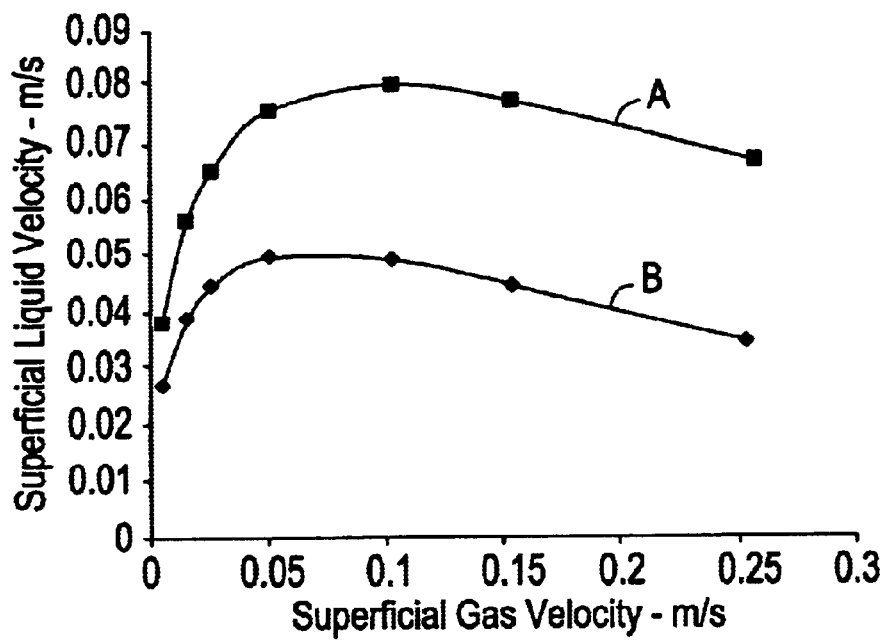
FIG. 7 is a graph illustrating liquid and gas flow velocities through a tank reactor.

FIG. 7 of the drawing is a plot showing the relationship between superficial gas velocity within the channels of a monolith and the resulting superficial liquid velocity within those channels generated from bubble gas-lift. The velocities are reported in meters/second on the horizontal and vertical graph axes, respectively.

The data plotted in the graph of FIG. 7 are for two cylindrical monolithic honeycomb catalyst beds A and B, of 200 and 400 cells/in2 (31 and 62 cells/cm$^2$, respectively) channel density, respectively, these honeycombs having channel wall thicknesses of 0.0075 inches (0.19 mm) and 0.0065 inches (0.165 mm), respectively. All walls in these honeycombs support an internal catalyst coating of 20 $\mu$m thickness, and both monoliths have a cross-sectional area 3.14 m$^2$ and a height to diameter ratio of 1:1.

The results shown are for the case where the monoliths are disposed within a cylindrical tank reactor vessel of 4.91 m$^2$ cross-section, the difference in cross-section between each monolith and the reactor vessel making up the cross-sectional area of the down-comer spaces within the reactor. The fluid viscosities and densities used are those for a liquid phase of water and a gas phase of hydrogen at 40° C. and a pressure of 20 bar.

As FIG. 7 suggests, honeycomb channel diameter has a large effect on frictional flow resistance within the channels, reflected in the large differences in liquid velocity at equivalent gas velocities within these structures. Also evident from FIG. 7 is the fact that maximum superficial liquid velocities are attained only over a relatively narrow range of gas velocities. Higher gas velocities actually cause a decrease in liquid velocities in these structures.

The hydrodynamic liquid/gas flow behavior illustrated in FIG. 7 is typical of honeycomb monolith catalyst structures and is seen over a wide range of liquid densities, liquid viscosities, and channel sizes. At any fixed gas flow velocity within the ranges shown, higher liquid viscosities, or lower liquid densities, decrease liquid flow velocity through the channels. However, maximum liquid flow velocities are still attained only in a limited range of gas flow velocities.

Hydrodynamic performance characteristics like those of FIG. 7 are also observed over a wide range of honeycomb sizes. Flow velocities are largely independent of catalyst bed height, since both frictional flow effects and the mass of liquid being transported through the channels at any time depend directly on channel length. Increases in bed cross-section do not change the flow velocities either, although the recirculation number (number of volumes of reactant processed through the catalyst bed per hour) increases in direct proportion to the area of the bed, provided down-comer capacity is not limiting.

All of the foregoing reactor designs offer significant advantages over packed bed, stirred tank, bubble column or jet loop reactors for many applications. However, still further advantages in process control and reactor performance for three-phase reactions are achieved through the use of special reactor configurations that include provisions for independent gas and liquid flow control. Examples of such reactors are schematically illustrated in FIGS. 8 and 9 of the drawings.

Figure 8:
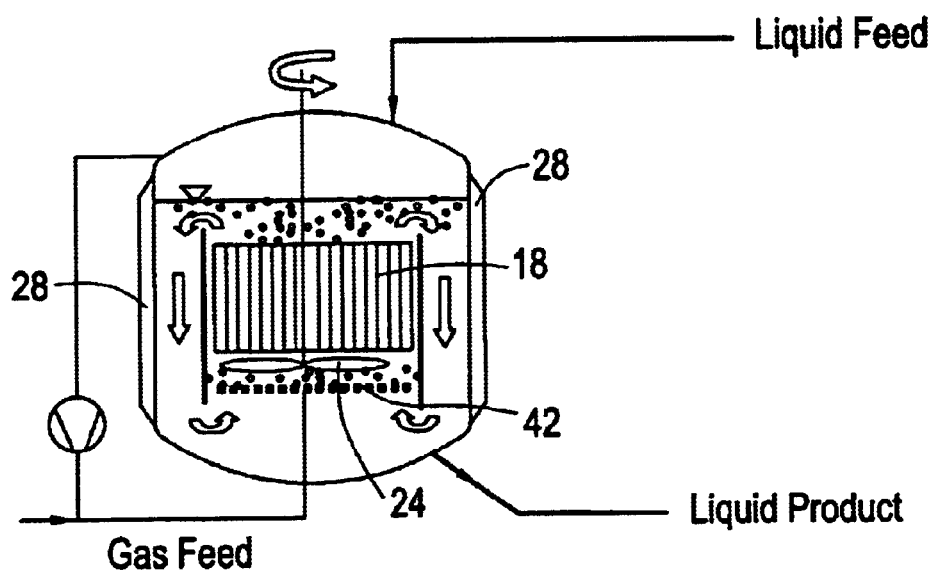
FIG. 8 is a schematic view of a tank reactor of the present invention showing a centrally positioned honeycomb monolith catalyst with centrally positioned gas header and blade type agitator flow means.

The reactor embodiment shown in FIG. 8 is similar to that of FIG. 3, except that both a mechanical flow agitator 24 and a disk-shaped bubble flow agitator 42 are provided within the reactor vessel. The recirculating flowpath of the reactant liquid indicated by arrows f is analogous to that shown in FIG. 3. However, in the case of the FIG. 8 reactor, liquid flow is controlled not only by the gas feed from agitator header 42, producing upwardly moving bubbles in honeycomb channels 18, but also by mechanical agitator 24. Thus agitator 24 can add to or reduce the flow of liquid into channels 18 resulting from gas bubble lift alone.

Figure 9:
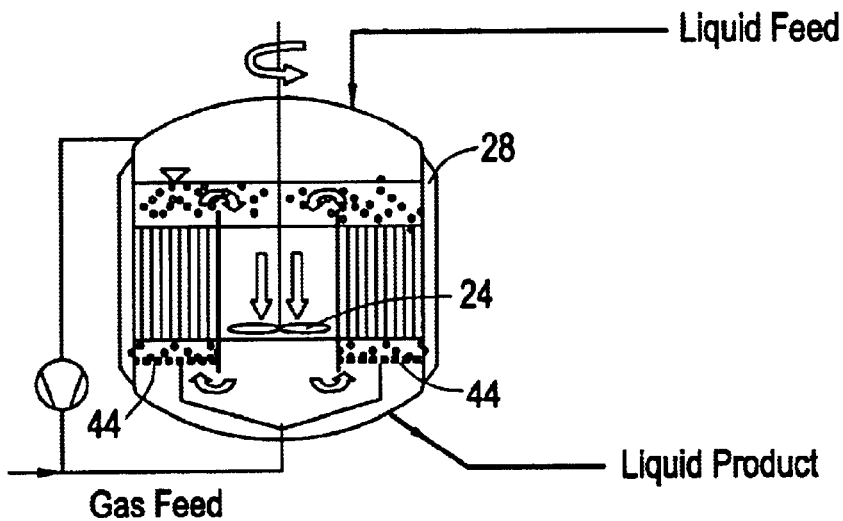
FIG. 9 is a schematic view of a tank reactor of the present invention showing a peripherally positioned monolithic honeycomb catalyst with peripherally positioned gas header agitator flow means and a centrally located blade type agitator flow means.

The reactor embodiment shown in FIG. 9 is similar to that of FIG. 4, except that again both a mechanical flow agitator 24 and an annular bubble flow agitator 44 are provided. The recirculating flowpaths of the reactant liquid indicated by arrows g is the same as that shown in FIG. 4, but with liquid flow velocity in this case being a product of both the gas feed from agitator header 44 and mechanical agitator 24. Again, mechanical agitator 24 can add to or reduce the flow of liquid into channels 18 at most available gas flow rates.

Of course, in either of the embodiments of FIGS. 8 and 9 the blade-type mechanical agitator is only representative of the various means by which liquid flow through the channels of the honeycomb catalyst may be independently controlled. Other flow control means such as liquid jets, including jets arranged to handle externally recycled volumes of the processed reactants, may additionally or alternatively be employed.

Figure 10:
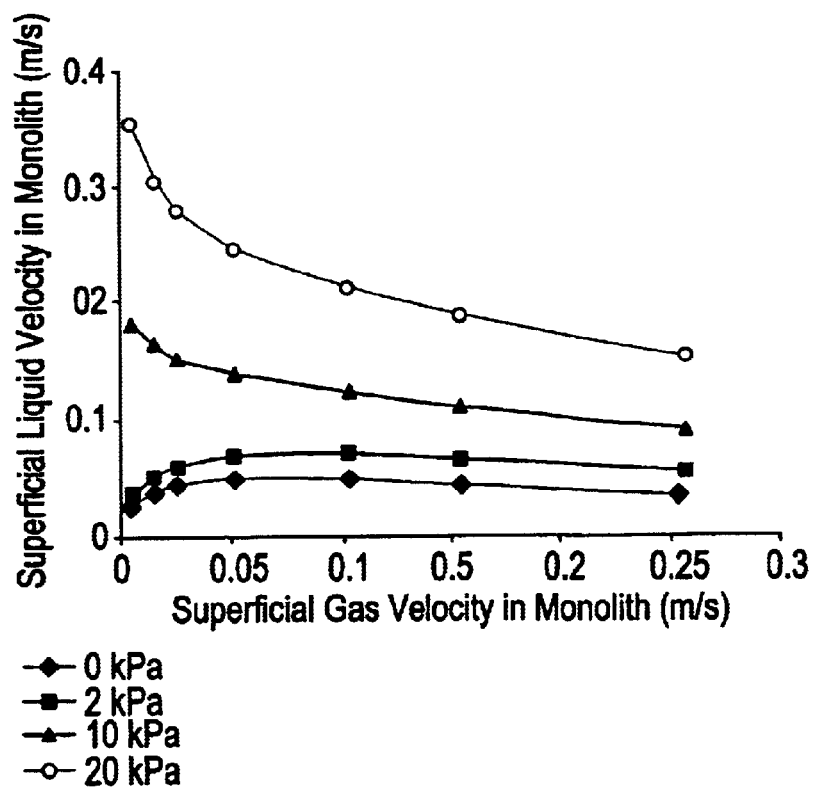
FIG. 10 is a graph illustrating liquid and gas flow velocities through a tank reactor such as illustrated in FIG. 8 of the drawings.

The added ranges of gas and liquid flow achievable in these reactor designs is illustrated in FIG. 10 of the drawings. That illustration is a graph plotting liquid flow velocity against gas flow velocity for four different operating conditions of a reactor having a design such as shown in FIG. 8 of the drawings. The operating conditions reported are developed through the application of additional mechanically generated liquid circulation driving forces. Those additional forces create additional liquid pressure drop across a honeycomb monolith at selected values from zero to 20 kPa, the higher pressure drops being generated by mechanical agitator operation at higher stirring speeds.

The honeycomb monolith in the reactor characterized in FIG. 10 has a cell density of 400 cell/in2 (62 cells/cm$^2$) and a honeycomb cross-section of 3.14 m$^2$, with a wall and coating thickness similar to the honeycomb of the same geometry described above with reference to FIG. 7. The characterization presented is for a liquid phase of water and a gas phase of hydrogen at 40° C. and a 20 bar pressure.

Evident from a study of FIG. 10 are the wider ranges of liquid and gas linear velocity observed within the reactor (e.g. providing superficial liquid velocities in the range from below 0.05 to about 0.35 m/s and superficial gas velocities from below 0.025 to above 0.25 m/s), these ranges being the result of the new degree of freedom available through the application of the additional mechanical liquid driving force. This added force permits reactor operation over a much wider range of variation in the ratio of gas to liquid flow in the monolith. For example, high liquid flow velocities can be achieved at zero or low gas flow velocities, an operating mode that substantially increases the recirculation number for the reactor. This brings conditions within the reactor closer to those of an ideally mixed system. Another significant advantage of the higher recirculation number is an increase in the heat exchange efficiency of the reactor, where such is useful for process control.

A general measure of the efficiency of any system for contact or mass transfer among two or more phases within a vessel is the achieved mass transfer coefficient, $k_L a$, as a function of the energy input per unit volume of fluid in the vessel. This value is useful for the evaluation of apparatus for carrying out physical processes such as absorption, separation or heat exchange as well as for catalytic chemical reactors involving mass transfer among gas, liquid and/or solid phases. Higher $k_L a$ values can be achieved either through a higher gas/liquid/solid contact area (a larger honeycomb) or higher energy input to the reactor. Thus if the energy input per unit volume of liquid in a given monolithic honeycomb reactor is fixed at a predetermined value, then the value of $k_L a$ will increase with honeycomb volume due to the larger catalyst wall area presented by additional channels or longer channel walls.

Gas-liquid mass transfer occurring within reactor spaces outside of the volume occupied by the honeycomb catalyst in these reactors is negligible in many reactor designs, due to factors such as the gas and liquid coalescence that quickly occurs as these fluids exit the honeycomb channels. Nevertheless, for the purpose of comparing the mass transfer efficiency of these reactors with alternative reactor designs, the measured or calculated mass transfer rates (expressed as mass transfer coefficients $k_L a$) are based on the total liquid volume within the reactor vessel, rather than on liquid volume within the active catalyst alone.

For reactors of 10–15 m$^3$ liquid handling capacity that are similar in design to the reactors shown in the drawings, specific reactor power inputs of up to about 2000 W/m$^3$ can be generated gas bubble flow agitation alone. Accordingly values of $k_L a$ in the range of about 0.1–1.2 second$^{-1}$ can be reached, even where the honeycomb catalyst volume is only 25–50% of the liquid phase volume. Still higher efficiencies, and/or equivalent efficiencies at significantly lower energy inputs, can be achieved using a combination of gas and mechanical agitation for input power.

Figure 11:
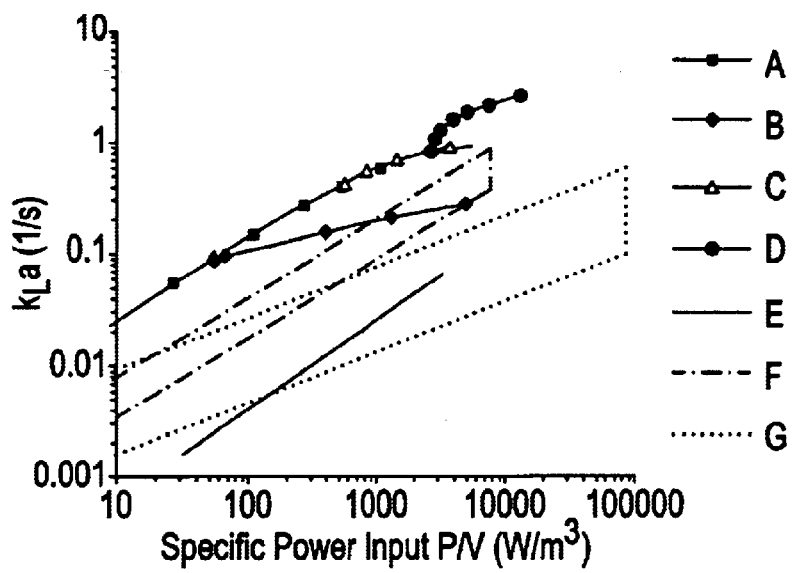
FIG. 11 is a graph illustrating the effect of reactor power input on mass transfer efficiency for a reactor of the invention.

FIG. 11 of the drawing is a graph plotting mass transfer coefficient $k_L a$ against reactor input power in watts/m$^3$ for a number of different reactor operating conditions. The data presented in the graph are for a reactor of 4.91 m$^2$ cross-section and 2.5 m height, the catalyst consisting of a honeycomb having 62 vertically-oriented channels per cm$^2$ of honeycomb cross section, with a cross-sectional area of 3.14 m$^2$ and a height of 1.5 m. The liquid phase within the reactor is water, and the gas phase is air at 1 bar pressure and 20° C.

Included in FIG. 11 are data for bubble flow operation alone, covering a range of power inputs resulting from different gas flow rates, as well as data for three different cases involving energy input from a combination of bubble flow and stirring. In the latter three cases, gas flow is fixed at a predetermined level and higher input energies are reached by stirring at increasing rates to increase the liquid recirculation through the catalyst. FIG. 11 also plots $k_L a$ values as a function of input energy for three competing batch reactor types. The data presented for the competing designs are considered to be representative of the performance of stirred tank, bubble column, and jet loop reactor designs.

Referring more particularly to FIG. 11, Curve A plots $k_L a$ as a function of reactor input power for the case of bubble flow agitation only. Curves B, C and D plot $k_L a$ values for combinations of bubble agitation with propeller blade stirring. The latter curves are plotted for three different fixed gas feed rates.

Curve A covers a range of gas feed rates from zero to about 5000 m$^3$/hour (at standard temperature and pressure). Curves B, C and D show the energy and reactor efficiency increases from added mechanical stirring, starting at the base energy levels corresponding to the gas-only agitation points of 100 m$^3$/hr, 1000 m$^3$/hr, and 5000 m$^3$/hr on curve A. Thus the increases in input power and transfer efficiency above the gas-only values falling on curve A (i.e. the values at the junctions of curves B, C and D with curve A) all result from increases in the stirring rate alone.

As is evident from a study of FIG. 11, the increase in $k_L a$ and mass transfer with mechanical agitation reflected at the lowest gas flow rate (100 m$^3$/hr-Curve B of the drawing) is smaller than could be achieved using equivalent power input from bubble agitation. However, that increase is still significant for reactions that need to be carried out at high liquid flow velocities.

At the fixed gas feed rate of 1000 m³/hr plotted on Curve C, the power input through the mechanical agitator yields the same increase in mass transfer as if more gas was added. Thus over the overlapping ranges of reactor input power level, the gas:liquid ratio within the catalyst bed may be arbitrarily adjusted to best meet the requirements of any selected chemical process. Curve D indicates that, at gas feed rates above 1000 m³/hr, additional mechanical agitation increases the mass transfer coefficient of the reactor to values well above those achievable through bubble agitation alone.

Curves E, F, and G in FIG. 11 compare the monolith loop reactor of Curves A–D with various conventional gas-liquid mass transfer systems. The data for these latter systems are based on literature measurements for oxygen transfer into an aqueous liquid phase, the latter phase in some cases containing some additives to suppress gas and liquid coalescence for improved mass transfer performance. The values covered in FIG. 11 for a stirred tank reactor design (Curve F) and a jet loop reactor (Curve G) reflect upper and lower limits for a range of mass transfer efficiencies at each energy level, base on performance ranges from the literature. In the case of the bubble column reactor, only one data set is plotted.

The higher efficiency and improved mass transfer performance of the monolith loop reactors over the competitive designs characterized in FIG. 11 are evident. Thus, over most of the useful range of input power shown (e.g. from below 100 to in excess of 10,000 W/m³ of liquid volume), monolith loop reactors provide significantly higher mass transfer rates (e.g., phase mass transfer coefficients $k_L a$ of from at least 0.1 to in excess of 2 per second) at lower energy inputs than any of the other designs provide. And, these advantages are secured even in operating modes where the power input to the monolith reactor is provided by bubble agitation alone, the latter modes being particularly advantageous since no mechanical systems for the input of stirring or other mechanical agitation are required.

A specific example of a commercial process wherein a monolith loop reactor would provide significant processing advantages is the selective hydrogenation of p-isobutyl acetophenone (p-IBAP) to the ibuprofen intermediate p-isobutyl phenyl 2-ethanol (p-IBPE). This reaction is conventionally carried out in a methanol solvent in stirred tank reactors containing particulate ruthenium/alumina catalysts. Side reactions such as (i) the hydrogenation of the aromatic ring of p-IBAP to produce 4isobutylcyclohexyl methyl ketone, (ii) the hydrogenation of p-IBPE to produce 4isobutylcyclohexyl-2-ethanol, and (iii) the hydrogenation of the OH-group of p-IBPE to produce p-isobutyl ethylbenzene are commonly observed, and alternative palladium/carbon and Raney nickel catalysts have been suggested to control such reactions.

Figure 12:
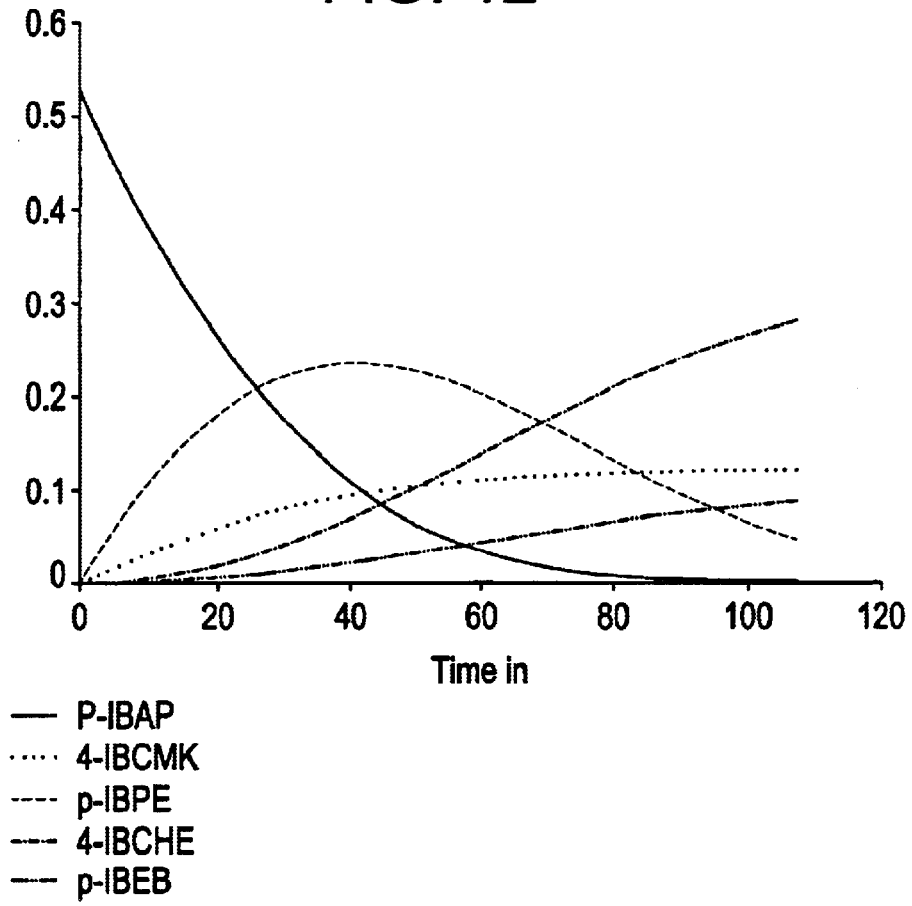
FIG. 12 is a graph of reactant concentration versus time for a chemical reaction carried out in accordance with the invention.

FIG. 12 of the drawing shows transient reactant and product concentrations for this process calculated for the case of a honeycomb loop reactor incorporating a monolithic honeycomb catalyst having a cell density of 400 cpsi (62 cells/cm²), the channels being coated with a 5 μm thick layer of a Ru/Al2O3 catalyst and reactor operation being at a pressure of 47.6 bar and a temperature of 386° K. The transients shown in FIG. 12 are quite similar to those reported in the literature for slurry reactors employing particulate ruthenium/alumina catalysts, but significant processing and cost advantages can be secured if monolith loop reactors are used instead.

Among the advantages of the monolith loop reactor design are a somewhat lower specific power input requirement, since providing the hydrogen reactant through the reactor bubbler system increases channel flow and reactor mass transfer at no added cost. Further, filtering to separate the catalyst from the reactant mixture is not required, avoiding the need for filtration equipment and the inevitable loss of catalyst in the course of filtration. And, catalyst effectiveness can be further increased simply by increasing the catalyst loading on the monolith, whereas higher catalyst loadings in slurry systems increase catalyst attrition as well as reactor stirring power requirements.

Another characteristic advantage of monolith loop reactors such as herein described is an added safety margin for the control of "run-away" exothermic reactions. Self-accelerating reactions wherein reaction rate increases exponentially with temperature can cause reactor heating beyond the point where the available means for heat removal are adequate to deal with the exotherm. In most slurry reactors these run-away processes can only be controlled by means such as dumping with rapid catalyst separation, or by the addition of chemical "moderators" to the batch. Moderator additions are generally undesirable since they can result in batch contamination and loss of the entire batch.

In the monolith loop reactors of the invention, these difficulties are conveniently overcome simply by providing mechanical means for dumping reactants from the tank or rapidly withdrawing the monolithic catalyst from the reaction mixture. In either case the reactants rapidly drain and separate from the monolithic catalyst, quickly terminating the reaction without damage to the reactants or products present in the mixture.

As will be apparent from the foregoing description, the invention is not restricted to the particular examples of reactor designs or processes hereinabove described, which are intended to be illustrative rather than limiting. For example, gas-liquid contacting or reaction systems can readily be provided wherein mechanical agitation is used to force gas and liquid downflow through the honeycomb catalyst, rather than upflow through the catalyst as in FIGS. 8 and 9 of the drawings. Designs of this type can provide longer gas-liquid contact time since, after passage through the catalyst, the gas remains dispersed in the liquid phase as it traverses the up-comer conduits within the reactor.

This extra contact time can be particularly significant in reactors configured to contain honeycomb catalysts of high length:diameter ratio. However, even in upflow reactors, the use of high length:diameter honeycombs offers a contact time advantage since bubble coalescence is suppressed for so long as the gas bubbles remain confined to the channels of the honeycomb. And, bubble rise times fall in a relatively narrow range since the bubbles are typically all of similar size.

It is also possible, in the case of downflow reactors, to deploy supplemental honeycomb catalysts in the up-comer space within the reactor. For reactors operating in this mode the driver for fluid circulation up the honeycomb channels can be bubble agitation alone.

Of course, as previously noted, the reactor designs disclosed herein may also be adapted for use in mass or energy transfer applications wherein liquid or liquid-gas mixtures are processed for purposes other than carrying out chemical reactions therein. Thus the fluid channeling characteristics of honeycomb monoliths can offer significant advantages for any recirculation-based chemical or physical adsorption, absorption, stripping or mixing process wherein mass or energy exchanges among two or more gas, liquid or solid phases must be efficiently supported.

I claim:

1. A method of producing a product from a reactant within a recirculating tank reactor which comprises, feeding a liquid medium comprising a reactant into a tank reactor, fixedly positioning a monolithic honeycomb substrate comprising a plurality of parallel, vertically oriented open channels having catalytic surfaces within said tank reactor so as to leave room therein for at least one adjacent bypass passageway, initiating internal agitation within the tank reactor to initiate a flow of said reactant through said open channels, said agitation being at an input power level in the range of 100–10,000 W/m$^3$ of liquid volume;

recirculating such flow of reactant through said open channels of said fixedly positioned catalyzed honeycomb substrate and through said adjacent bypass passageway to secure a phase mass transfer coefficient in the range of 0.1–2 sec$^{-1}$, and removing a product from said tank reactor.

2. A method in accordance with claim 1 wherein the step of initiating agitation comprises initiating mechanical internal agitation to recirculate the flow of reactant within the bypass passageway.

3. A method in accordance with claim 1 wherein is the step of recirculating the flow of reactant comprises forcing gas into the liquid medium and forming upwardly flowing bubbles in the liquid medium.

4. A method in accordance with claim 1 wherein the step of fixedly positioning the monolithic honeycomb substrate within the tank reactor comprises fixedly positioning the honeycomb substrate adjacent inner sidewall portions of the tank reactor.

5. A method in accordance with claim 1 wherein the step of fixedly positioning the monolithic honeycomb substrate within the tank reactor comprises fixedly positioning the honeycomb substrate centrally within the tank reactor.

6. A method of producing a product from a reactant within a recirculating tank reactor which comprises, feeding a reactant provided in a liquid medium into a tank reactor, fixedly positioning a monolithic honeycomb substrate within said tank reactor, the substrate comprising vertically-oriented honeycomb channels having catalytic surfaces and the substrate being disposed so as to leave room therein for at least one adjacent bypass passageway;

internally activating a flow of said reactant and a gas within said tank reactor to recirculate the reactant and the gas through said honeycomb channels, said flow being activated by independent means for gas and liquid flow control including internal agitation at an input power level in the range of 100–10,000 W/m$^3$ of liquid volume;

controlling the ratio of gas flow to liquid flow through the honeycomb channels by independently controlling the means for gas and liquid flow control to secure a phase mass transfer coefficient in the range of 0.1–2 sec$^{-1}$; and removing a product from said tank reactor.

7. A method in accordance with claim 6 wherein the means for independent gas and liquid flow control comprise a gas feed header and a mechanical stirrer.

8. A method in accordance with claim 6 wherein the gas contains a gas reactant.

9. A method in accordance with claim 6 wherein the means for independent gas and liquid flow control provide a superficial liquid velocity in the range of 0.05–0.35 m/s and a superficial gas velocity in the range of 0.025–0.25 m/s through the honeycomb channels.

* * * * *